(No Model.)
H. L. GARDNER.
HOSE REEL.
No. 300,355. Patented June 17, 1884.
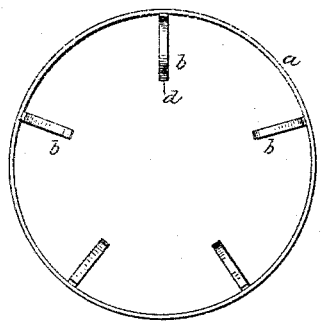
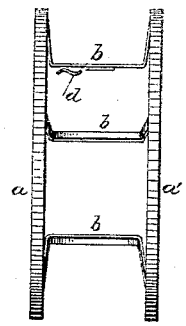
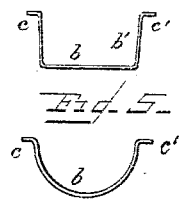
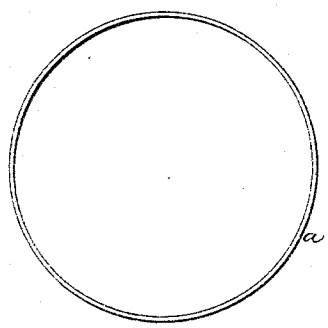
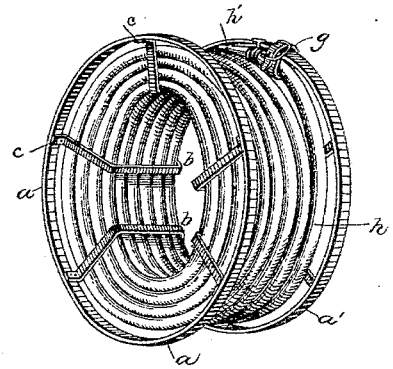
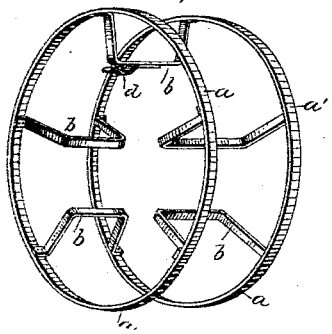
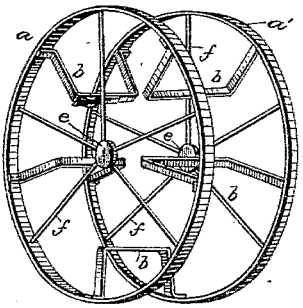
WITNESSES
Franck L. Ourand
Wm L. Pheiden
INVENTOR
Henry L. Gardner
By Allen Webster
*Attorney*

UNITED STATES PATENT OFFICE.

HENRY L. GARDNER, OF SPRINGFIELD, MASSACHUSETTS, ASSIGNOR TO DAVID S. LOOMIS, OF SAME PLACE.

HOSE-REEL.

SPECIFICATION forming part of Letters Patent No. 300,355, dated June 17, 1884.

Application filed July 3, 1882. (No model.)

*To all whom it may concern:*

Be it known that I, HENRY L. GARDNER, a citizen of the United States of America, residing at Springfield, in the county of Hampden, in the State of Massachusetts, have invented a new and useful Improvement in Hose Carriages or Reels, of which the following is a specification.

The object of my invention is to provide a light, simple, cheap, and easily-operative carriage or reel for garden or light hose, and I accomplish this by the construction herein shown.

My invention therefore consists in a hose carriage or reel having the side pieces connected together by a series of inwardly-projecting cross-bars, bails, or loops, having their ends secured to the rims, treads, or sides of the side pieces at or near their peripheries.

My invention further consists in the novel construction and combination of parts, as herein described and shown.

In the accompanying drawings, in which similar letters of reference indicate like parts, Figure 1 is a side view of the device as constructed without spokes. Fig. 2 is a front view of the same. Figs. 3 and 4 are views of the parts separated. Fig. 5 is a view of a modified form of the cross-bars, bails, or loops. Fig. 6 is a perspective of a carriage or reel without spokes, and having a hose wound thereon. Fig. 7 is a perspective of the device without hose. Fig. 8 is a perspective of the device made with spokes and hubs.

The construction will be readily understood by reference to the drawings, wherein the letter $b$ represents cross-bars, bails, or loops of the form substantially as shown in Figs. 3 and 5. These bars, bails, or loops have their ends suitably secured to the side pieces or rims, with the bail or loop projecting inward, thus serving as connecting means between the side portions, and in their relative positions forming the hose-carrying portion of the device.

More particularly describing the device, as shown in the drawings, the letters $a$ $a'$ represent rims or treads of the sides, having secured to them the ends $c$ $c'$ of the cross-bars, bails, or loops $b$. To one of the bars is attached a spring, $d$, by which one end of the hose may be grasped, preparatory to reeling it.

In Fig. 6 I have shown hose $h$ reeled up and the nozzle end $h'$ secured by a strap, $g$; and in Fig. 8 I have shown the sides supplied with hubs $e$ and spokes $f$.

The advantages of my improved construction over old devices are seen in the fact that a wheel with very light spokes and hub may be used, or that rims only may be used having neither spokes or hubs.

The holding capacity of the reel may be varied by varying the length of the supporting or connecting bars, thus either varying the distance of separation of the sides or varying the depth of the hose-recess.

The particular shape of the cross-bars or supporting-bails is not material, provided there is sufficient inward bend or deflection to form the hose-holding recess.

I am aware that a fishing reel or spool has heretofore been made by forming the sides with arms which are a part of or are secured to solid central disks adapted to revolve upon their centers, and I make no claim to such construction. My invention relates to hose carriages or reels, and I do not rely upon any internal or central support for the hose-supporting parts or bars.

I am also aware of United States Patent No. 191,461, dated May 29, 1877, and I make no claim to the construction therein shown.

What I claim as my invention, and desire to secure by Letters Patent, is—

1. A hose-reel consisting of two wheels connected by bent bars secured to the rims of the wheel, substantially as shown and described.

2. A skeleton hose-reel consisting of two rims without spokes or hubs, and rigidly connected together by bent bars, substantially as shown and described.

3. A hose carriage or reel having the hose-supporting parts $b$ depending inwardly and secured to the side portion at or near their peripheries, substantially as described.

HENRY L. GARDNER.

Witnesses:
CHAS. N. HALL,
ALLEN WEBSTER.